US010008116B1

(12) United States Patent
Sandbrook

(10) Patent No.: US 10,008,116 B1
(45) Date of Patent: Jun. 26, 2018

(54) VEHICLE PRESENCE DETECTION SYSTEM

(71) Applicant: Frogparking Limited, Palmerston North (NZ)

(72) Inventor: Donald H. Sandbrook, Palmerston North (NZ)

(73) Assignee: Frogparking Limited, Palmerston North (NZ)

(*) Notice: Subject to any disclaimer, the term of this patent is extended or adjusted under 35 U.S.C. 154(b) by 0 days. days.

(21) Appl. No.: 15/609,453

(22) Filed: May 31, 2017

(51) Int. Cl.
*B60Q 1/48* (2006.01)
*G08G 1/14* (2006.01)
*G08G 1/04* (2006.01)

(52) U.S. Cl.
CPC ............... *G08G 1/142* (2013.01); *G08G 1/04* (2013.01)

(58) Field of Classification Search
CPC combination set(s) only.
See application file for complete search history.

(56) References Cited

U.S. PATENT DOCUMENTS 7,312,722 B2* 12/2007 Tillotson .................. G08G 1/14 340/932.2
8,279,107 B2 10/2012 Krstanovic
9,373,256 B2 6/2016 Sandbrook
9,589,465 B2 3/2017 Sandbrook
2001/0052860 A1 12/2001 McMaster
2006/0212344 A1* 9/2006 Marcus .................. G07B 15/02 705/13
2006/0250278 A1* 11/2006 Tillotson .................. G08G 1/14 340/932.2
2009/0098903 A1 4/2009 Donaldson
2011/0099126 A1 4/2011 Belani
2013/0106621 A1 5/2013 Cecchet
2015/0339924 A1 11/2015 Cook
2017/0024619 A1* 1/2017 Wu .................... G06K 9/00812
2017/0039852 A1* 2/2017 Nordbruch ............... G08G 1/14
2017/0236417 A1* 8/2017 Carrara .................. G08G 1/141 340/932.2

FOREIGN PATENT DOCUMENTS

EP 1772838 6/2010
WO WO2013114139 8/2013

* cited by examiner

*Primary Examiner* — Travis Hunnings
(74) *Attorney, Agent, or Firm* — Neustel Law Offices

(57) ABSTRACT

A vehicle presence detection system for determining whether a parking space is vacant or occupied and utilizing this information to guide vehicles to available parking spaces. generally includes a LIDAR device, a cloud-based processing unit, a database, and a guidance light. The LIDAR device generally includes a light emitter, a light sensor, a CPU, a memory unit, and a communications device. The LIDAR device determines the distance between itself and a parking spot or a vehicle parked in that parking spot using an algorithm that accounts for variances in the ambient conditions. This status information can be communicated to a cloud-based processing unit, which can store this information in a database and/or use this information to send parking status indications to an autonomous vehicle dynamic sign, mobile device, or guidance light.

23 Claims, 10 Drawing Sheets

VEHICLE PRESENCE DETECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a vehicle presence detection system for determining whether a parking space is vacant or occupied and utilizing this information to guide vehicles to available parking spaces.

Related Art

Any discussion of the related art throughout the specification should in no way be considered as an admission that such related art is widely known or forms part of common general knowledge in the field.

The disclosed Vehicle Presence Detection System utilizes LIDAR, which is generally understood to be an acronym for Light Detection And Ranging. LIDAR is a surveying method that measures distance to a target by illuminating that target with a pulsed laser light, and measuring the reflected pulses with a sensor. Differences in laser return times and wavelengths can then be used to make digital representations of the target.

Vehicle detection within a parking space for the purposes of guiding traffic or parking enforcement has been around for some time. Traditional methods of vehicle detection within parking spaces include including infra-red, magnetometer, image processing, ultrasonic and inductive loops.

Inductive loops are impractical to install and are unreliable, which is why they are often reserved for entry and exit points as opposed to individual parking spaces.

The use of ultrasonic techniques is an established technology, yet it is unreliable because it is susceptible to wind disturbances for the short-range measurements required for parking detection.

The use of image processing for vehicle detection is complicated and therefore prone to errors. Although the use of image captures has the advantage of not requiring placement of a device near parking spaces, it is highly susceptible to difficult to control environmental conditions such as lighting and weather.

Magnetometer based vehicle detection sensors typically measure disruptions in the earth's magnetic field caused by the presence of a vehicle. However, this disruption is small and unpredictable, as well as being temperature dependent. For at least these reasons, magnetometer based sensors have never achieved a high level of detection accuracy. They are also typically mounted on a road surface, which decreases reliability and longevity due to this harsh environment.

Infra-red sensors rely heavily upon a clear or translucent window through an enclosure. This enclosure window is easily prone to damage easily rendering these sensors useless. When the enclosure window is blocked, either deliberately accidentally, or due to inclement weather, such as snow, they are no longer functional. Typically, these systems are also road mounted, which again decreases reliability and longevity.

Because of the inherent problems with the related art, there is a need for a new and improved vehicle presence detection system for effectively detecting the presence of a vehicle in a parking spot and utilizing this status information.

SUMMARY

An example embodiment is directed to a vehicle presence detection system. The vehicle presence detection system generally includes a LIDAR device, a cloud-based processing unit, a database, and a guidance light. The LIDAR device generally includes a light emitter, a light sensor, a CPU, a memory unit, and a communications device. The LIDAR device determines the distance between itself and a parking spot or a vehicle parked in that parking spot using an algorithm that accounts for variances in the ambient conditions. This status information can be communicated to a cloud-based processing unit, which can store this information in a database and/or use this information to send parking status indications to an autonomous vehicle, dynamic sign, mobile device, or guidance light.

There has thus been outlined, rather broadly, some of the embodiments of the Vehicle Presence Detection System in order that the detailed description thereof may be better understood, and in order that the present contribution to the art may be better appreciated. There are additional embodiments of the Vehicle Presence Detection System that will be described hereinafter and that will form the subject matter of the claims appended hereto. In this respect, before explaining at least one embodiment of the Vehicle Presence Detection System in detail, it is to be understood that the Vehicle Presence Detection System is not limited in its application to the details of construction or to the arrangements of the components set forth in the following description or illustrated in the drawings. The Vehicle Presence Detection System is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1A:
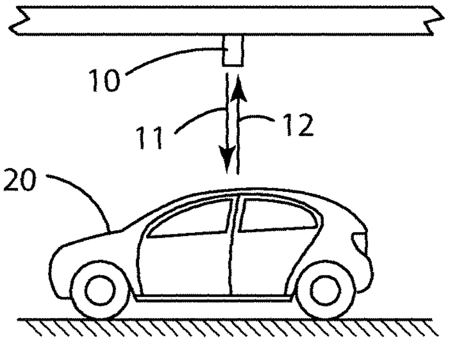
FIG. 1A is a side view of a LIDAR device mounted above a parking spot being used to detect the vehicle presence status of that parking spot, wherein a vehicle is present.

Turning now descriptively to the drawings, in which similar reference characters denote similar elements throughout the several views, FIGS. 1A through 14 illustrate a vehicle presence detection system, which generally comprises a LIDAR device 10, a cloud-based processing unit 40, a database 41, and a guidance light 45. The LIDAR device 10 generally includes a light emitter 30 that produces laser pulses 11, a light sensor 31 that detects reflections 12 of laser pulses 11, a CPU 32, a memory unit 33, and a communication device 34. The vehicle presence detection system may also communicate with an autonomous vehicle 42, a dynamic sign 43, and a mobile device 44. The detection method described herein uses LIDAR to determine the time of flight for reflections 12 to determine the distance of an object away from a light emitter 30. A LIDAR device 10 can be used to determine the occupancy of multiple parking spaces from a singular location. A guidance light 45 integrated with a LIDAR device 10 can be used to indicate the availability of the associated parking spaces.

B. Exemplary Telecommunications Networks

The Vehicle Presence Detection System may be utilized upon any telecommunications network capable of transmitting data including voice data and other types of electronic data. Examples of suitable telecommunications networks for the Vehicle Presence Detection System include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The Vehicle Presence Detection System may communicate via a single telecommunications network or multiple telecommunications networks concurrently. Various protocols may be utilized by the electronic devices for communications such as but not limited to HTTP, SMTP, FTP and WAP (wireless Application Protocol). The Vehicle Presence Detection System may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The Vehicle Presence Detection System may also be utilized with online services and internet service providers.

The Internet is an exemplary telecommunications network for the Vehicle Presence Detection System. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Mobile Device

The mobile device may be comprised of any type of computer for practicing the various aspects of the Vehicle Presence Detection System. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the Vehicle Presence Detection System. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

D. LIDAR Device

Figure 6:
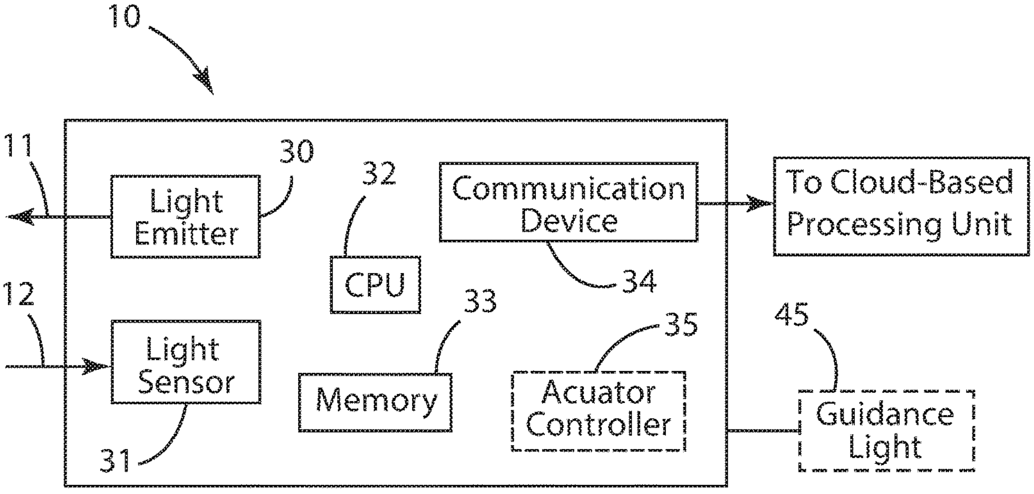
FIG. 6 is a functional diagram of an exemplary LIDAR device for use with a vehicle presence detection system in accordance with this disclosure.

The disclosed vehicle presence detection system comprises a LIDAR device 10, which is best shown in FIG. 6. LIDAR device 10 comprises a light emitter 30, a light sensor 31, a central processing unit 32, a memory unit 33, and a communications device 34. The communications device 34 is generally used to communicate status to a cloud-based processing unit 40. LIDAR device 10 may optionally include an actuator controller 35 that can be used to alter the direction of the LIDAR device 10 using an actuator (not shown). In addition, LIDAR device 10 may optionally be connected to a guidance light 45. It is important to note that FIG. 6 is a functional diagram, and the components shown for LIDAR device 10 may not be on a single circuit board or within a single enclosure.

LIDAR device 10 can be used to measure distance using the time it takes for light to travel from light emitter 30 to light sensor 31 after having reflected off an object. It is typical for LIDAR devices 10 to emit rapid pulses of laser light 11. These rapid pulses can conceptually be considered a beam even though the laser light is not continuous. Laser light is directional, which makes it easier to control the vector of distance measurement. Because the speed of light is fixed, this time measurement can easily be converted into a distance. FIGS. 1-4 illustrate this concept in the context of a LIDAR device 10 being used to determine the distance between a LIDAR device 10 and a vehicle 20. In FIG. 1A, the LIDAR device 10 uses its light emitter 30 to produce a pulsed laser light beam 11 that contacts a vehicle 20 which results in a reflected beam 12 that is detected by the light sensor 31. Because pulsed laser light beam 11 is generally comprised of multiple pulses, detection of reflected beam 12 generally comprises detection of multiple pulses. Although reflected beam 12 is illustrated as a direct reflection of the pulsed laser light beam 11, in practice, the pulsed laser light beam 11 will scatter upon contact with an object. However, at least a portion of this scattered light will be directed back towards the LIDAR device 10 and detected by its light sensor 31. Reflected beam 12 represents the portion of pulsed laser light beam 11 that is reflected back towards LIDAR device 10.

Figure 1B:
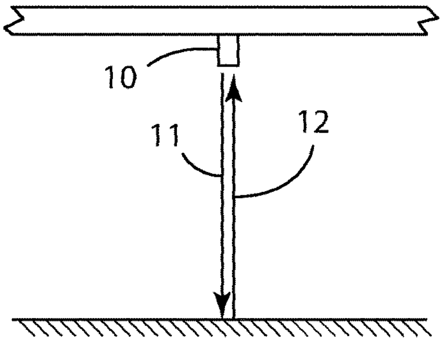
FIG. 1B is a side view of a LIDAR device mounted above a parking spot being used to detect the vehicle presence status of that parking spot, wherein a vehicle is not present.

The LIDAR device 10 is most effective when positioned to have the most direct reflection. FIGS. 1A and 1B illustrate a LIDAR device 10 that is positioned directly above a parking spot and pointed downward. In FIG. 1A, LIDAR device 10 uses its light emitter 30 to produce a pulsed laser light beam 11 that contacts vehicle 20 which results in a reflected beam 12 that is detected by the light sensor 31. In FIG. 1B, the LIDAR device 10 operates in the same manner except that the reflected beam 12 results from pulsed laser light beam 11 contacting the surface of the parking lot rather than vehicle 20. Because of this difference in circumstances, the pulsed laser light beam 11 in FIG. 1A is shorter than the pulsed laser light beam 11 in FIG. 1B. Accordingly, the LIDAR device can determine that vehicle 20 is present in FIG. 1A and absent in FIG. 1B.

Figure 2:
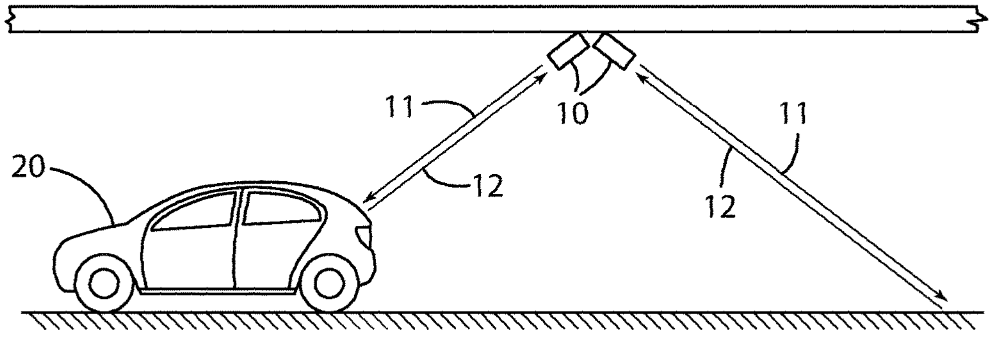
FIG. 2 is a side view of two LIDAR devices mounted above and to the side of two parking spots being used to detect the vehicle presence status of those parking spots, wherein one parking spot is vacant and the other parking spot is occupied.

LIDAR device 10 can also function when it is directed at a parking spot at an angle as shown in FIG. 2. Although the distance travelled by pulsed laser light beam 11 is longer than the respective distances shown in FIGS. 1A and 1B, the difference between the distance travelled when a vehicle 20 is present and the distance travelled when a vehicle 20 is absent can be still be used to determine if a vehicle 20 is present in a parking spot.

Figure 3:
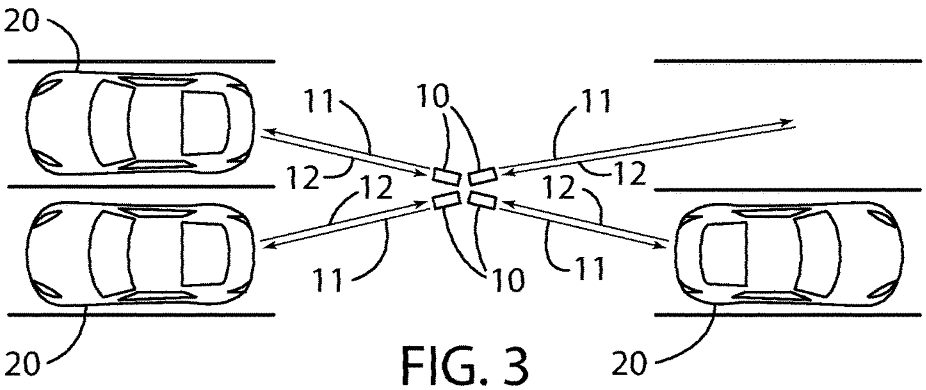
FIG. 3 is a top-down view of four LIDAR devices mounted above and to the side of four parking spots being used to detect the vehicle presence status of those parking spots, wherein one parking spot is vacant and the other three parking spots are occupied.
Figure 4:
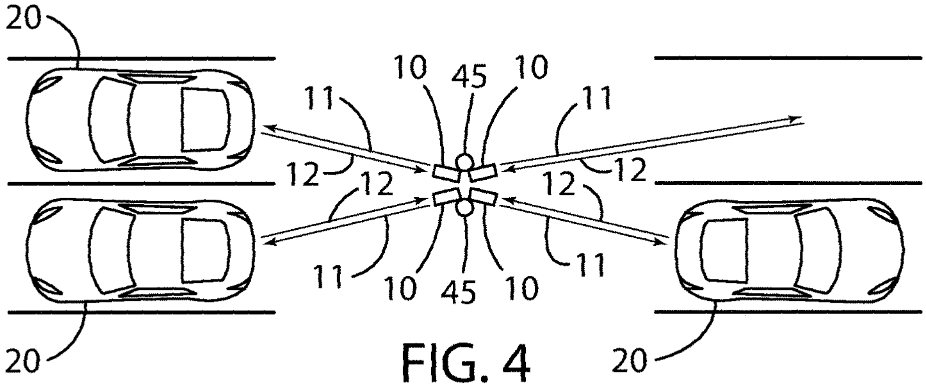
FIG. 4 is a top-down view of four LIDAR devices and two guidance lights mounted above and to the side of four parking spots being used to detect the vehicle presence status of those parking spots, wherein one parking spot is vacant and the other three parking spots are occupied.

LIDAR device 10 can also be used as part of a cluster of LIDAR devices 10 as shown in FIG. 3. This may be desirable for indoor applications. However, it is also applicable to outdoor applications, wherein the cluster of LIDAR devices 10 can be mounted on a pole 21 such as a preexisting light pole. In the embodiment shown in FIG. 3, each of the four LIDAR devices 10 are directed towards a different parking spot, in which three of those parking spots are occupied. By measuring the flight time of the reflected beam 12, it can be determined whether a particular parking spot is occupied. In some embodiments, this determination is based on comparing the flight time of reflected beam 12 when the parking spot is vacant to the flight time of reflected beam 12 when the parking spot is occupied.

When a LIDAR device 10 is in close proximity to other LIDAR devices 10, as shown in FIG. 3, for example, it may be necessary to take steps to avoid interference between the LIDAR devices 10 because beams of pulsed laser light 11 will produce reflections in many directions in addition to back towards the originating LIDAR device 10. In some embodiments, each LIDAR device 10 may comprise blinders, filters or some other mechanism to prevent a reflected beam 12 from being detected by a LIDAR device 10 other than the one that originated it. In other embodiments, the operation of each LIDAR device 10 is coordinated such that only a subset of LIDAR devices 10 are taking measurements at a given instance. For example, in the embodiment shown in FIG. 3, the LIDAR devices on the right may alternate measurements, while the LIDAR devices 10 on the left may independently alternate measurements. In other embodiments, proximate LIDAR devices 10 may use different wavelengths of light to help determine the source of a reflected beam 12.

In addition to reflections created by other LIDAR devices 10, light sensor 31 may also detect reflections of reflections caused by the pulsed laser light beam 11 being reflected off multiple surfaces. However, this problem can be overcome because the first detected reflected beam 12 will have taken the shortest route and will generally have the highest intensity. Provided that the emissions of pulsed laser light beams 11 are sufficiently spaced, multiple reflections can be accommodated. In the preferred embodiment, LIDAR measurements are taken twice per second (i.e., 2 Hz frequency).

Figure 12A:
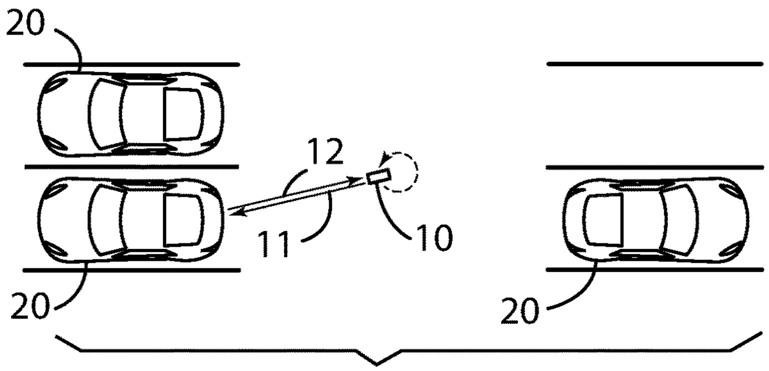
FIG. 12A is a top-down view of a scanning LIDAR device mounted above and to the side of four parking spots that is being used to detect the vehicle presence status of those parking spots, wherein the scanning LIDAR device is directed towards the lower-left parking spot.
Figure 12B:
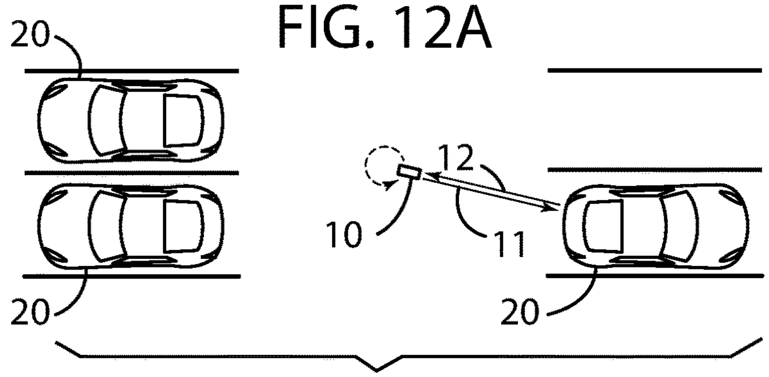
FIG. 12B is a top-down view of a scanning LIDAR device mounted above and to the side of four parking spots that is being used to detect the vehicle presence status of those parking spots, wherein the scanning LIDAR device is directed towards the lower-right parking spot.
Figure 12C:
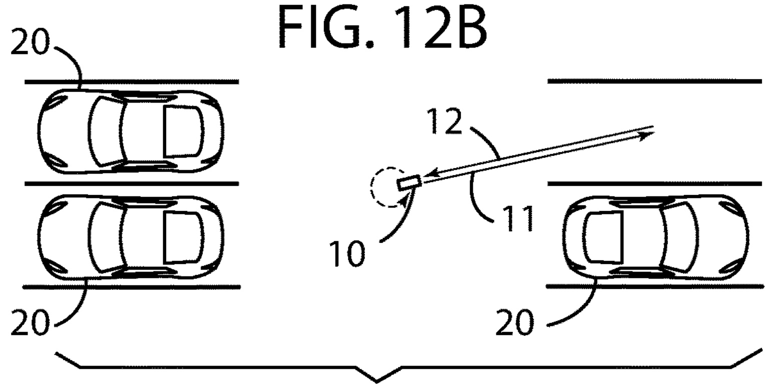
FIG. 12C is a top-down view of a scanning LIDAR device mounted above and to the side of four parking spots that is being used to detect the vehicle presence status of those parking spots, wherein the scanning LIDAR device is directed towards the upper-right parking spot.
Figure 12D:
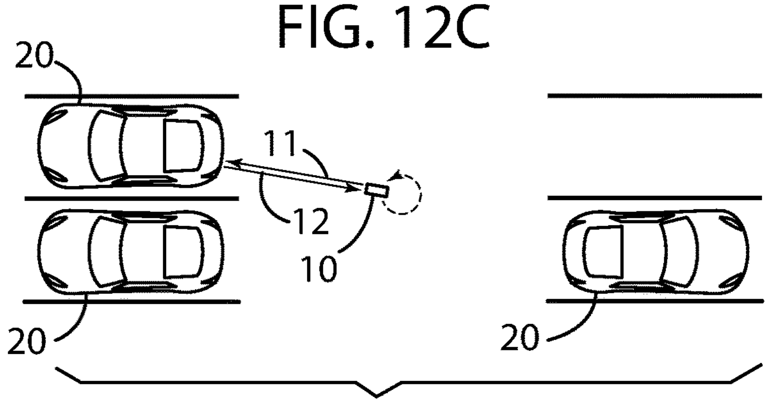
FIG. 12D is a top-down view of a scanning LIDAR device mounted above and to the side of four parking spots that is being used to detect the vehicle presence status of those parking spots, wherein the scanning LIDAR device is directed towards the upper-left parking spot.

In other embodiments, such as the one shown in FIGS. 12A-12D, a single LIDAR device 10 can be used to monitor a plurality of parking spaces by altering its direction to scan each parking space individually. This embodiment reduces the number of LIDAR devices 10 required per parking spot, and avoids some of the issues associated with having multiple LIDAR devices 10 in close proximity. In the embodiment shown in FIG. 12A, the parking spot in the lower-left parking spot is being scanned. This is followed by rotating the LIDAR device 10 to scan the parking spot in the lower right parking spot, as shown in FIG. 12B. This process continues as the LIDAR device 10 is directed at the upper-right parking spot, then, the upper-left parking spot as shown in FIGS. 12C and 12D. The process then repeats at the lower-left parking spot.

Figure 13:
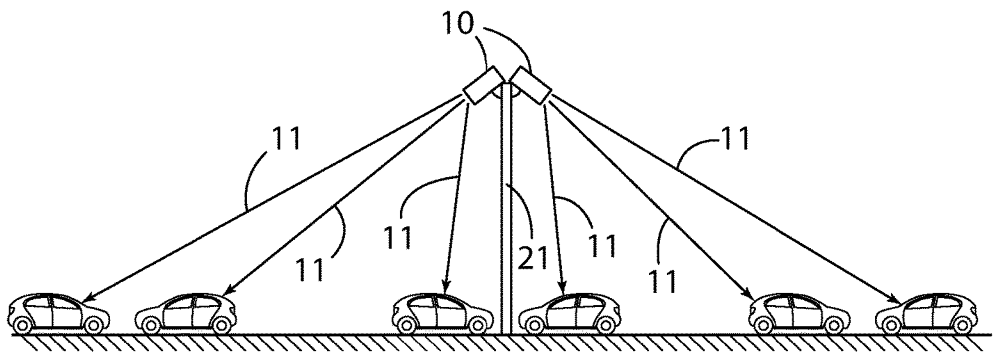
FIG. 13 is a side view of two scanning LIDAR devices each being used to monitor three parking spots on either side of a pole.

As shown in FIG. 13, a cluster of LIDAR devices 10 can be combined with using a LIDAR device 10 to scan a plurality of parking spots. For sake of clarity, only the pulsed laser light beams 11 are shown, but there will be reflected beams 12 in operation as shown in FIGS. 1-4, for example. FIG. 13 illustrates a pair of LIDAR devices 10 attached to a pole 21. The LIDAR device 10 on the left is configured to move up and down to alternately scan parking spots on opposite sides of a left center aisle. FIG. 13 also shows a LIDAR device 10 on the right that is configured to move up and down to alternately scan parking spots configured on opposite sides of a right center aisle. Because the parking spots on either side of the center aisle are at different distances away from LIDAR device 10, the flight time of reflected beam 12 when a parking spot is vacant and the flight time of the reflected beam 12 when the parking spot is occupied will not be the same.

Figure 14:
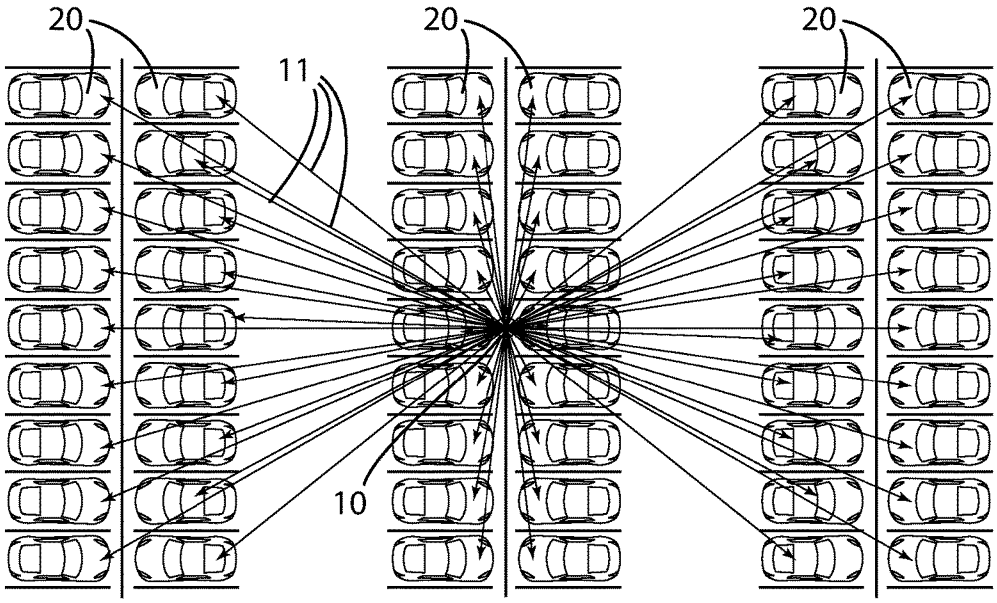
FIG. 14 is a top-down view of one or more LIDAR devices being used to detect the vehicle presence status of 54 parking spots arranged in 3 rows of 18 and separated by two center aisles.

FIG. 14 illustrates the use of a plurality of LIDAR devices 10 to monitor a plurality of parking spots. For example, the pair of LIDAR Devices 10 shown in FIG. 13 can also be configured to move laterally in addition to up and down to scan a large number of parking spots. Assuming the use of two LIDAR devices 10 as shown in FIG. 13, two LIDAR devices 10 can be used to scan 54 parking spots.

E. Central Processing Unit

LIDAR device 10 generally includes a central processing unit (CPU) 32 and a memory unit 33. The CPU 32 controls the functionality of LIDAR device 10 including the emission of a pulsed laser light beam 11, detection of its reflected beam 12, and a determination of whether the parking spot is vacant or occupied. CPU 32 may also send information to a cloud-based-processing unit 40 using communications device 34. In circumstances where the LIDAR device 10 is configured to change its direction, CPU 32 may also utilize an actuator controller 35 to control and monitor the direction of the LIDAR device 10. Also, if present, CPU 32 may also control the status of a guidance light 45. In some embodiments, LIDAR Device 10 may comprise a plurality of light sensors 31 and a plurality of light emitters 32 so that a single LIDAR device 10 can monitor a plurality of parking spots. In other embodiments, the functionality of CPU 32 can be off-loaded to a cloud-based processing unit 40 or to another LIDAR device 10 using a master/slave relationship.

Figure 9:
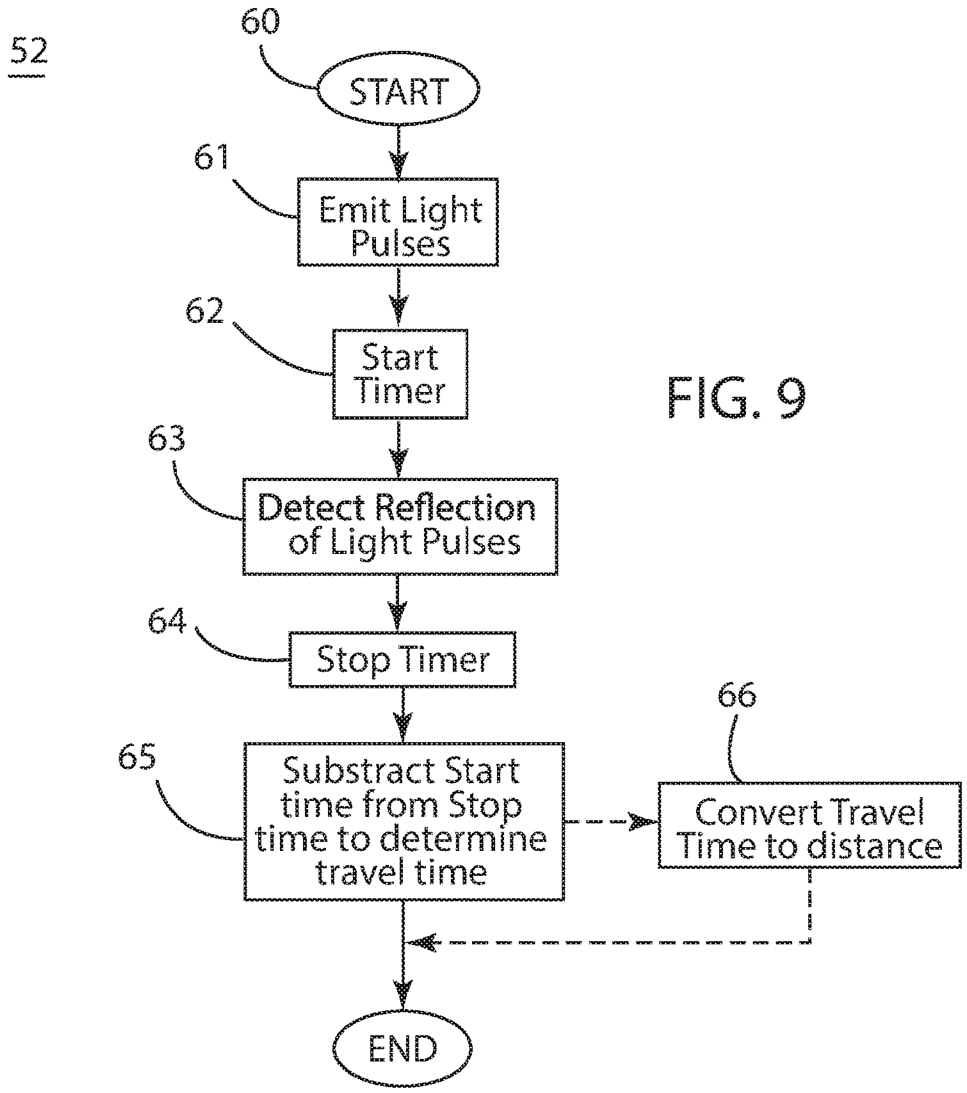
FIG. 9 is a flow chart illustrating the steps used to measure distance with an exemplary LIDAR device for use with a vehicle presence detection system in accordance with this disclosure.

FIG. 9 illustrates the process used by a LIDAR device 10 under the control of a CPU 32 to measure the length of a reflected beam 12. Step 60 reflects the function of measuring distance being invoked. At step 61, a light emitter 30 is used to generate a pulsed laser light beam 11. At substantially the same time as step 61, a timer is started at step 62. Generally, the order of step 61 and step 62 can be reversed. This timer can be a separate structure or integrated with CPU 32. After a short, yet appreciable time later, a reflected beam 12 is detected by a light sensor 31 at step 63. This is immediately followed by step 64 when the timer is stopped. At step 65, the start time is subtracted from the stop time to determine the combined travel time (i.e., flight time) of the pulsed laser light beam 11 and the reflected beam 12. If the timer operates like a stopwatch, then the travel time is equal to the stop time because the start time would be zero. However, if the timer uses a fixed clock, then the travel time must be calculated. In step 66, the travel time is optionally converted into a distance. In most circumstances, the length of the pulsed laser light beam 11 and the reflected beam 12 are the same. Therefore, because the speed of light is constant, the distance between LIDAR device 10 and the detected object can be determined by multiplying the travel time by ½ times the speed of light. However, because of the linear relationship between travel time and distance, this calculation is not strictly necessary.

Figure 7:
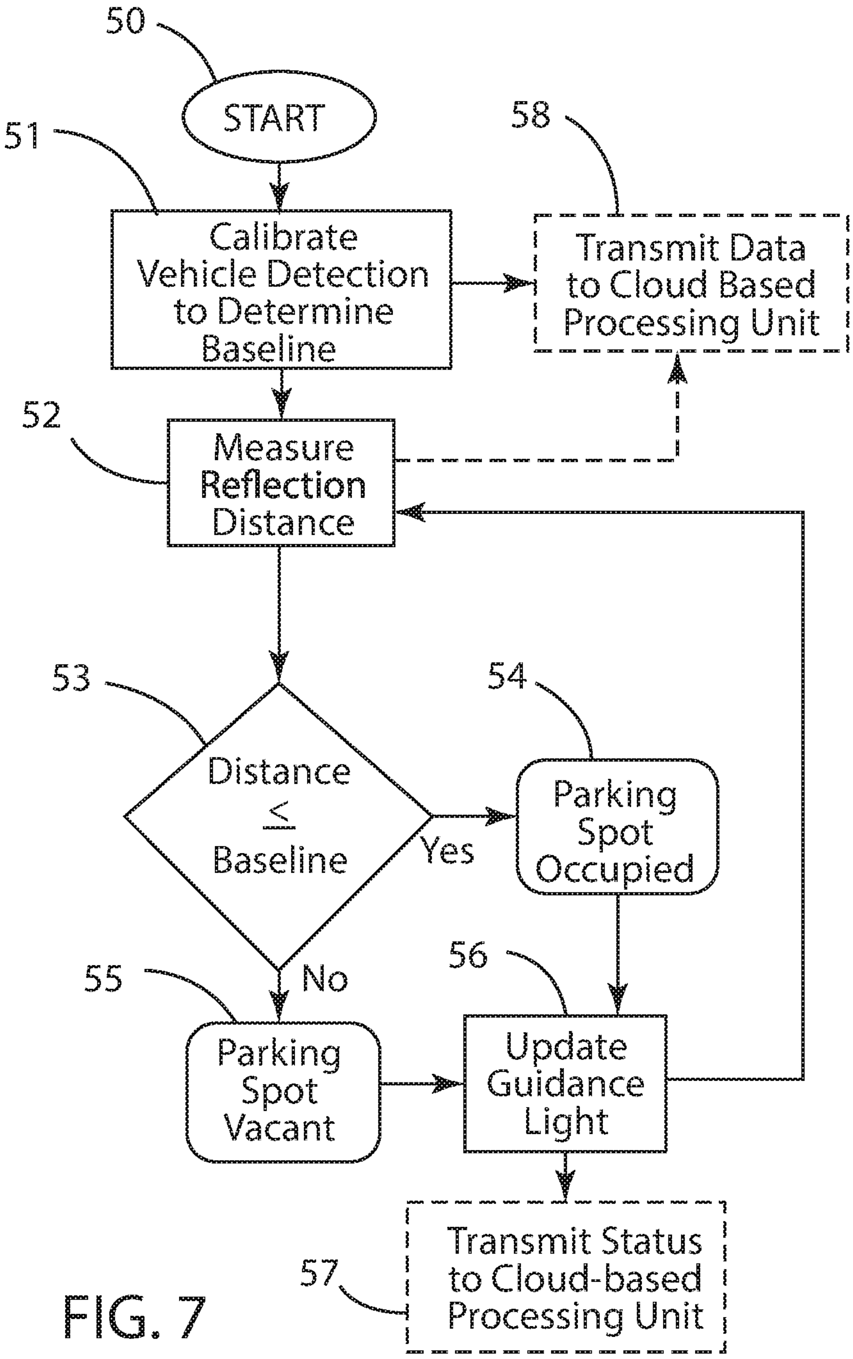
FIG. 7 is a flow chart illustrating the steps used in an exemplary embodiment of the disclosed vehicle presence detection system, wherein the guidance lights are controlled locally.

FIG. 7 illustrates an exemplary process that can be used to detect a vehicle's presence in a parking spot and utilize this information. When the system is activated at step 50, the first step is to calibrate the vehicle detection to establish at least one baseline at step 51. This baseline is generally either the distance between a LIDAR device 10 and the surface of the parking spot it is monitoring ("baseline surface distance"), or the distance between the LIDAR device 10 and a hypothetical vehicle parked in the parking spot it is monitoring ("baseline vehicle distance"). This generally comprises using the LIDAR device 10 to take a distance measurement when the parking spot is known to be vacant, which establishes the baseline surface distance. The baseline surface distance can be used to compute a baseline vehicle distance. These determinations can also be performed using other methods and directly provided to a CPU 32 for storage in a memory unit 33. If the LIDAR device 10 is configured to monitor multiple spots, step 51 is repeated for each spot so that a baseline can be established for each parking spot.

The baseline surface distance establishes the maximum expected distance, which means that any distance measurement that is greater than this distance must be erroneous. However, it may not be the case that any distance measurement less than the baseline surface distance means that the parking spot is occupied because of possible debris, vibrations of the LIDAR device 10, or other factors that may cause minor variations in measurement. For this reason, it is common to establish a baseline vehicle distance, which represents the distance between LIDAR device 10 when the parking spot is occupied by a hypothetical vehicle 20. This can be determined empirically by performing distance measurements when the parking spot is occupied. This can also be the result of calculation based on certain assumptions like the minimum expected height of a vehicle 20. When the LIDAR device 10 is at an angle, this distance reflects the minimum height of a reflective surface that is in the measurement path of LIDAR device 10, which could potentially be a bumper or hood rather than the top of a vehicle 20. In whatever manner that a baseline vehicle distance is determined, CPU 32 stores this value in a memory unit 33 for use in determining whether the parking spot is occupied. As explained above, because time and distance are interchangeable, the baseline vehicle distance may be expressed in units of time. This baseline data may optionally be transmitted to a cloud-based processing unit 40 at step 58.

At step 52, the LIDAR device 10 measures the distance of an object in front of the LIDAR device 10 when the state of the parking spot is indeterminate. This step generally follows the steps shown in FIG. 9 as discussed above. As with step 51, this information may optionally be transmitted to a cloud-based processing unit 40 at step 58.

At step 53, a determination is made whether the parking spot is occupied or vacant. In this simple embodiment, this determination is based on whether the measured distance is less than or equal to a baseline value, which is generally the baseline vehicle distance. If the measured distance is less than or equal to this baseline distance, the parking spot is determined to be occupied at step 54. Alternately, if the measured distance is not less than or equal to the baseline vehicle distance, the parking spot is determined to be vacant at step 55. In this embodiment, the parking spot's status as vacant (step 55) or occupied (step 54) is transmitted to a guidance light 45 at step 56 to provide a visual indication of the occupied/vacant status of one or more parking spots. In the example shown in FIG. 4, two guidance lights 45 are used to indicate the status of the four parking spots shown. Step 56 can optionally be followed by transmitting the vacancy status to a cloud-based processing unit 40 at step 57. Regardless of whether the occupancy status is transmitted to a cloud-based processing unit 40, the process repeats at step 52, where a new distance measurement is calculated.

Figure 8:
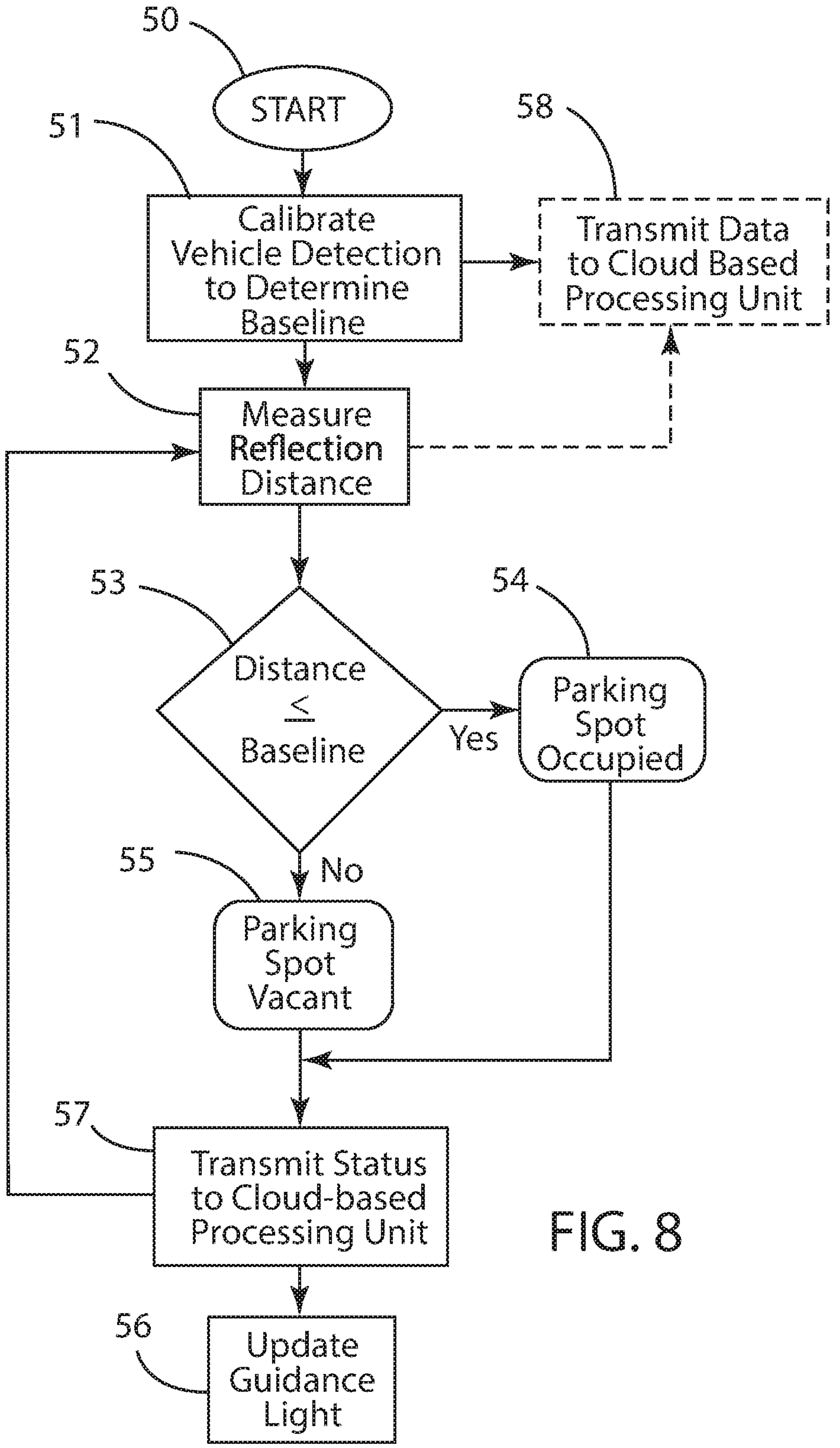
FIG. 8 is a flow chart illustrating the steps used in an exemplary embodiment of the disclosed vehicle presence detection system, wherein the guidance lights are controlled by a cloud-based processing unit.

FIG. 8 illustrates another exemplary process that can be used to detect a vehicle's presence in a parking spot and utilize this information. The process shown in FIG. 8 is substantially the same as the process shown FIG. 7. However, in this embodiment, the parking spot's status as vacant (step 55) or occupied (step 54) is always transmitted to a cloud-based processing unit at step 57. The cloud-based processing unit 40 will then update the guidance light as appropriate in step 56. The significance of this change in process is that the status of the guidance light 45 may not necessarily track the vacancy or occupancy status of the monitored parking spot. In certain applications, it may be advantageous to delay updating of the guidance light. Additionally, the cloud-based processing unit 40 may control when to repeat the process at step 52.

F. Cloud-Based Processing Unit

Figure 5:
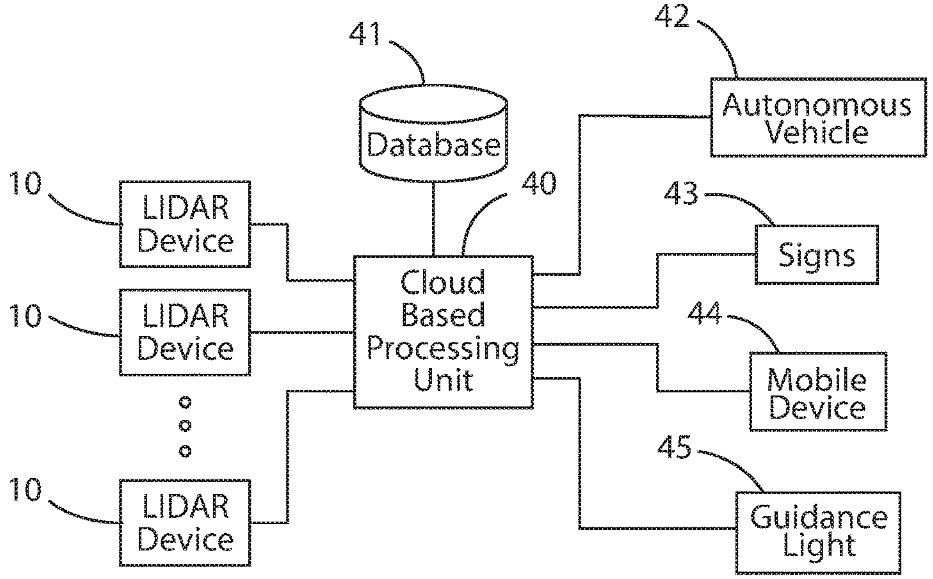
FIG. 5 is a functional diagram of an exemplary vehicle presence detection system in accordance with this disclosure.

As shown in FIG. 5, a vehicle presence detection system may include a cloud-based processing unit 40 in communication with one or more LIDAR devices 10. The cloud-based processing unit 40 can be used to store status updates from LIDAR devices 10, such as the current vacant/occupied status of one or more parking spots. This information can be stored in a database 41. In some embodiments, the cloud-based processing unit 40 can store configuration information for one or more LIDAR devices 10, such that each LIDAR device 10 will contact the cloud-based processing unit 40 as part of its initialization procedure. This could include the current calibration date and the date when it was collected, for example. This information could be used to instruct a LIDAR device 10 to recalibrate.

In addition to receipt and storage of information from a LIDAR device 10, the cloud-based processing unit 40 can also be used to send messages or control other devices, such as an autonomous vehicle 42, dynamic signs 43, a mobile device 44, and a guidance light 45. As discussed earlier, a guidance light 45 can be directly controlled by a corresponding LIDAR device 10, but it is also possible for it to be controlled by a cloud-based processing unit 40 for LIDAR devices 10 that are particularly unsophisticated.

A cloud-based processing unit 40 can be comprised of a single server or cluster of servers. The cloud-based processing unit 40 may be in a separate facility from the LIDAR devices 10, or in a nearby security station or maintenance room. In addition, the functionality of the cloud-based processing unit 40 may be distributed between local servers (i.e., in the same facility) and remote servers (i.e., not in the same facility). For example, a local server might be used to control the status of a dynamic sign 43, or a guidance light 45, and store status information. However, the local server might transmit this data to a remote server that communicates with an autonomous vehicle 42 or a mobile device 44. A remote server might also be used for long term storage data for possible analysis later.

The connection between the cloud-based processing unit 40 and a LIDAR device 10 can use any suitable communication medium, including wireless transport media, such as Wi-Fi Bluetooth, and RF, wired transport media, such as Fibre Channel and Ethernet, or any manner of combination.

In addition, the cloud-based processing unit 40 can store in the database 41 all manner of relevant data, including, but not limited to, parking structure locations and parking space details—their location and associated LIDAR Sensor Devices, users, login information, historical car transitions, details of associated dynamic signage, and operational parameters. The cloud-based processing unit 40 can utilize this data for many useful applications. By way of example, in an embodiment comprising a plurality of LIDAR devices 10 monitoring a larger plurality of parking spots with a dynamic sign 43 at the end of each row, the cloud-based processing unit 40 can manage the associations between parking spots, LIDAR devices 10, and dynamic signs 43. As an occupational state is changed, as determined by a LIDAR device 10, this is communicated to the cloud-based processing unit 40, which then updates the database 41 and communicates this information to the dynamic sign 43 at the start of each row as appropriate.

G. Guidance Light

As shown in FIGS. 5 and 6, a vehicle presence detection system may include one or more guidance lights 45 that indicate the vacant/occupied status of one or more parking spots. These lights 45 can take various forms, such as colored filament light bulbs, LCD displays, and LEDs, which are the preferred light source. In some embodiments, each parking spot has its own guidance light 45 that indicates green when its parking spot is vacant and red when its parking spot is occupied. In other embodiments, a single guidance light 45 is used to indicate that there is at least one vacant parking spot within a row. In other embodiments, the guidance light 45 is on only when a parking spot is vacant with the absence of light implicitly indicating that the parking spot is occupied. In still other embodiments, a guidance light 45 can be comprised of a set of arrows pointing in opposite directions. For example, in the embodiment shown in FIG. 4, there are two guidance lights 45 on either side of the cluster of LIDAR devices 10. The lower guidance light 45 could be configured with a green arrow pointing to the left and a green arrow pointing to the right. These lights 45 could be used to indicated whether at least one parking spot in that direction is available. In the embodiment shown in FIG. 4, both guidance lights 45 would have a green arrow illuminated and pointing to the right to indicate to cars approaching from either direction that there is a parking spot available.

The guidance light 45 can be controlled by one or more of the LIDAR devices 10 in its immediate vicinity. It may also be controlled by a remote cloud-based processing unit 40 that is not in the immediate vicinity of the guidance light 45 or LIDAR device 10. The appropriate configuration depends on the expected applications. For example, controlling a guidance light 45 by a co-located LIDAR device 10 avoids any problems associated with communication delays or disruptions between it and a cloud-based processing unit 40. However, having a guidance light 45 controlled by a cloud-based processing unit 40 may provide additional functionality, such as the ability to encourage or dissuade a particular vehicle from selecting a particular spot. For example, if two guidance lights 45 would otherwise be illuminated, the cloud-based processing unit 40 could turn one of them off to direct the driver towards a preferred parking spot. However, even if the driver chose to park in the less preferred spot, the cloud-based processing unit 40 could still be updated to reflect the current status of the monitored parking spots.

In addition to guidance lights 45, the status of monitored parking spots can also be indicated using a dynamic sign 43, or communication with a mobile device 44 or an autonomous vehicle 42. In the case of a dynamic sign 43, the cloud-based processing unit 40 could display a map indicating which spots are available and which ones are vacant. The dynamic sign 43 could also be used to provide a numerical indication of the number of parking spots available, as well as other indications.

In the case of a mobile device 44 and an autonomous vehicle 42, the cloud-based processing unit 40 could send messages directly to those that have subscribed to or requested status information regarding the monitored parking spots. In some embodiments, the cloud-based processing unit 40 is programmed to assign a specific parking spot to the autonomous vehicle 42 or the mobile device 44. In other embodiments, the cloud-based processing unit 40 may provide information regarding a plurality of available parking spots and leave it to the autonomous vehicle 42 or the user of the mobile device 44 to select a parking spot. In other embodiments, the cloud-based processing unit 40 sends an image to the mobile device 44 that is equivalent to a dynamic sign 43.

H. Operation of Preferred Embodiment

In the preferred embodiment, the vehicle presence detection system analyzes the distance data provided by the LIDAR Device 10 to intelligently determine whether a parking spot is occupied or vacant. The distances and other values discussed below are for an exemplary embodiment of a vehicle presence detection system and should not be considered limitations. Other embodiments of a vehicle presence detection system may utilize different values.

Figure 10:
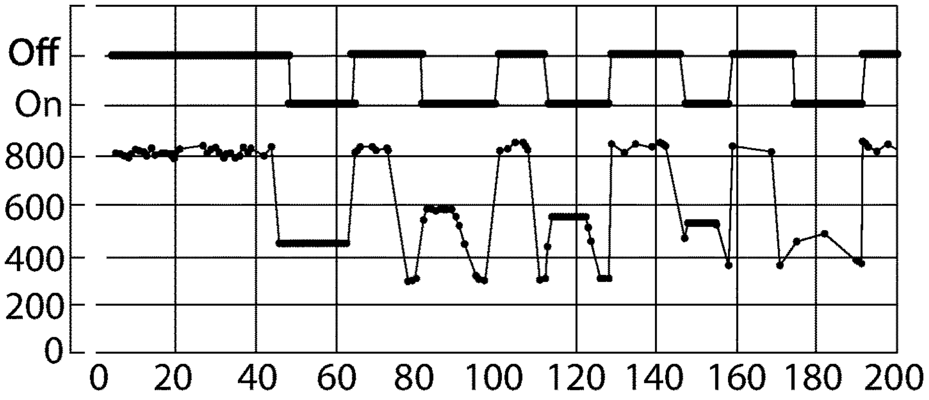
FIG. 10 is a chart mapping measured distance by a LIDAR device to the "On" or "Off" state for a parking spot monitored by a vehicle presence detection system in accordance with this disclosure.

FIG. 10 illustrates a plot showing measured distance in centimeters as a function of time. The upper plot indicates whether the vehicle detection system has determined that the parking spot is vacant ("off") or is occupied ("on"). This data was obtained by performing a distance measurement twice per second (i.e., 2 Hz frequency). As shown in the FIG. 10, the vehicle detection system determines that the parking spot is vacant when the measured distance is approximately 8 m (800 cm). However, when the measured distance is less than approximately 6 m (600 cm), the vehicle detection system determines that the parking spot is occupied. It is important to note that the measured distance is very close to 8 m when the parking spot is vacant, but the measurement when the parking spot is occupied is between 4 m and 6 m. This is a result of the different heights of vehicles 20. In the case of a LIDAR device 10 directed towards the parking spot at an angle, this will also change depending on how far into the spot a vehicle 20 is parked.

Figure 11:
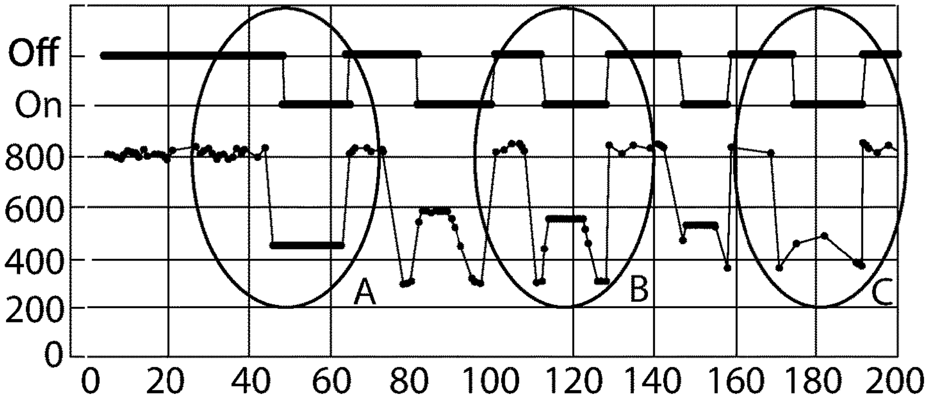
FIG. 11 is the same chart as FIG. 10 with indications of three areas of interest.
Figure 11A:
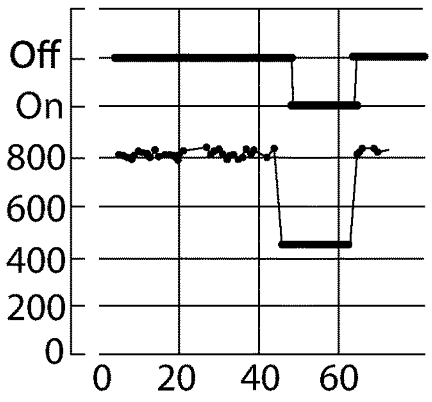
FIG. 11A is an expanded view of the first area of interest indicated in FIG. 11.

FIG. 11 illustrates the same plot as FIG. 10 with certain areas of interest highlighted. The first area of interest is shown in greater detail in FIG. 11A. As shown in this figure, the oscillations of measured distance in the vicinity of 8 m do not result in false positives (i.e., the parking spot being registered as occupied when it is actually vacant). If the baseline vehicle distance is sufficiently low, small variations are not disruptive. In other embodiments, the determination that the parking spot is occupied can be based on the stability of the reading, such as the one shown in FIG. 11A, the measurement can be used to establish a baseline vehicle distance, or simply recorded for later analysis to determine that the spot is no longer vacant.

Figure 11B:
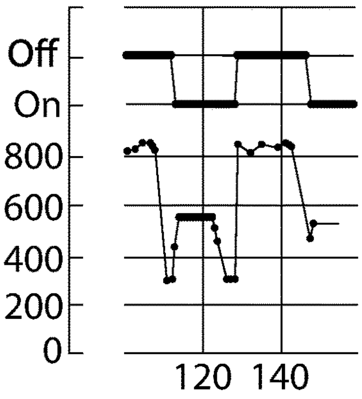
FIG. 11B is an expanded view of the second area of interest indicated in FIG. 11.

The second area of interest in FIG. 11 is shown in detail as FIG. 11B. FIG. 11B shows a brief excursion before reaching a stable distance measurement of approximately 5.5 m. This brief excursion is often the result of a vehicle passing through the path between a LIDAR device 10 and its parking spot, which commonly occurs when a vehicle enters and exits the parking spot monitored by that LIDAR device 10. However, this may also be the result of a pedestrian, or vehicle temporarily blocking the path between a LIDAR device 10 and its parking spot. The vehicle detection system can account for these brief excursions in at least two ways. In one embodiment, the vehicle detection system utilizes a minimum vehicle distance value to recognize the fact that a measured distance below a certain value is not an indication of a parked vehicle. In this embodiment, any values below this minimum vehicle distance can be disregarded. Accordingly, vehicle detection is based on having a measured distance greater than the minimum vehicle distance and less than the baseline vehicle distance.

In another embodiment based on FIG. 11B, vehicle presence detection is based on plurality of prior measured distances, generally consecutive. In this embodiment, the vehicle detection can be based on a moving average of prior measurements, or it can be based on disregarding extreme changes in measurement, such as the abrupt transition from 8 m to 3 m. In either case, once the measured distance stabilized at 5.5 m, the vehicle detection system can recognize that the state of the parking spot has changed to “On.” When switching from the “On” state to the “Off” state, the analysis may not be symmetric. In some embodiments, the state won’t change to “On” until the measured distance is stable, but will change the state to “Off” at the first indication.

Figure 11C:
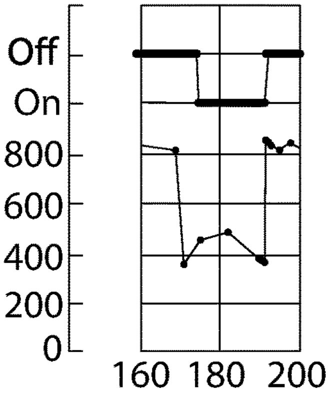
FIG. 11C is an expanded view of the third area of interest indicated in FIG. 11.

The third area of interest in FIG. 11 is shown in detail as FIG. 11C. FIG. 11C shows a signal with numerous missing measurements, which occurs when a pulsed laser light beam 11 does not result in the detection a reflected beam 12. This could be the result of vehicle shape, or particulate obstructions such as cigarette smoke or dust. Regardless of the cause, the vehicle detection system can account for these temporary conditions by maintain the current state until there is a clear indication that the state has changed. As shown in FIG. 11C, the measured distances below 4 m are disregarded by the vehicle detection system. Until the distance measurement of approximately 4.5 m is obtained, vehicle detection is maintained in the “Off” state. Similarly, the vehicle detection does not enter the “Off” state until the measured distance is over 8 m.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the Vehicle Presence Detection System is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the Vehicle Presence Detection System will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the Vehicle Presence Detection System, suitable methods and materials are described above. Thus, the Vehicle Presence Detection System is not intended to be limited to the embodiments shown, but is to be accorded the widest scope consistent with the principles and features disclosed herein.

What is claimed is:

1. A vehicle presence detection system, comprising:

a LIDAR device comprising a light emitter configured to emit pulsed laser light, and a light sensor configured to receive reflections of the pulsed laser light emitted by the light emitter, wherein the LIDAR device is directed towards a surface of a parking spot;

a memory unit; and a processing unit configured to:

use the LIDAR device to determine a measured distance that correlates to the distance travelled by reflections of the pulsed laser light from the LIDAR device;

store a measured distance in the memory unit as a baseline surface distance, wherein the baseline surface distance corresponds to the distance between the LIDAR device and the surface of the parking spot when the parking spot is vacant; and determine whether the parking spot is occupied based on a consecutive plurality of measured distances.

2. The vehicle presence detection system of claim 1, further comprising:

a plurality of LIDAR devices, wherein each of the plurality of LIDAR devices is directed towards a different one of a plurality of parking spots;

wherein the processing unit is configured to store a measured distance in the memory unit as a baseline surface distance between each of the plurality of LIDAR devices and its corresponding parking spot; and wherein the processing unit is configured to determine whether each of the plurality of parking spots is occupied based on a measured distance for each of the plurality of LIDAR devices and its corresponding to parking spot.

3. The vehicle presence detection system of claim 1, wherein the LIDAR device is configured to alter its direction towards each of a plurality of parking spots;

wherein the processing unit is configured to store a measured distance as a baseline surface distance for each of the plurality of parking spots, wherein each baseline surface distance corresponds to the distance between the LIDAR device and the surface of one of the plurality of parking spots when that parking spot is vacant; and wherein the processing unit is configured to determine whether each of the plurality of parking spots is occupied based on a measured distance for each of the plurality of parking spots.

4. The vehicle presence detection system of claim 1, wherein the LIDAR device is configured to alter its direction according to a period.

5. The vehicle presence detection system of claim 1, wherein the processing unit is configured to store a baseline vehicle distance corresponding to the distance between the LIDAR device and a vehicle parked in the parking spot, wherein the baseline vehicle distance of the parking spot is less than the baseline surface distance for the parking spot; and wherein the processing unit is configured to determine if the parking spot is occupied by determining if the measured distance is less than the baseline vehicle distance.

6. The vehicle presence detection system of claim 1, wherein the processing unit is configured to store a baseline vehicle distance corresponding to the distance between the LIDAR device and a vehicle parked in the parking spot, wherein the baseline vehicle distance for the parking spot is less than the baseline surface distance for the parking spot;

wherein the processing unit is configured to store a minimum vehicle distance, wherein the minimum vehicle distance for the parking spot is less than the baseline vehicle distance for the parking spot; and wherein the processing unit is further configured to:

discard any measured distance that is greater than the baseline surface distance or less than the minimum vehicle distance; and determine that the parking spot is occupied if the measured distance is less than the baseline vehicle baseline and greater than the minimum vehicle distance.

7. The vehicle presence detection system of claim 1, wherein the processing unit is configured to determine a measured distance twice per second.

8. The vehicle presence detection system of claim 7, wherein the processing unit is configured to store each measured distance in a computer storage medium.

9. The vehicle presence detection system of claim 1, wherein the processing unit is configured to determine that the parking spot is occupied based on a plurality of measured distances for the parking spot.

10. The vehicle presence detection system of claim 1, wherein each of the consecutive plurality of measured distances is substantially equal to the other members of the consecutive plurality of measured distances.

11. The vehicle presence detection system of claim 1, wherein the processing unit is further configured to transmit information to a cloud-based processing unit; and wherein the cloud-based processing unit is configured to:

store information received from the processing unit in a database; and transmit information related to the occupancy or vacancy of at least one parking spot to a remote device, wherein the remote device is selected from the group consisting of: a vehicle, a mobile device, a guidance light, and a dynamic sign.

12. A method of detecting the presence of a vehicle in a parking spot comprising:

directing a LIDAR device in the direction of a parking spot, wherein the LIDAR device comprises a light emitter configured to emit pulse laser light and a light sensor configured to receive a reflection of the pulsed laser light emitted by the light emitter;

using the LIDAR device to determine a baseline surface distance by determining the distance between the LIDAR device and a surface of a parking spot when the parking spot is vacant;

determining a baseline vehicle distance corresponding to the distance between the LIDAR device and a vehicle parked in the parking spot, wherein the baseline vehicle distance is no greater than the baseline surface distance;

using the LIDAR device to determine a measured distance that correlates to the distance travelled by reflections of pulsed laser light from the LIDAR device;

determining that the parking spot is occupied, if the measured distance is less than or equal to the baseline vehicle distance; and determining that the parking spot is vacant, if the measured distance is greater than the baseline vehicle distance.

13. The method of claim 12, further comprising the step of transmitting to a cloud-based processing unit, at least one of: the baseline surface distance, the baseline vehicle distance, the measured distance, whether the parking spot is occupied, and whether the parking spot is vacant.

14. The method of claim 13, further comprising the step of using the cloud-based processing unit to store at least a portion of the information transmitted to the cloud-based processing unit.

15. The method of claim 14, further comprising the step of using the cloud-based processing unit to transmit an indication of whether the parking spot is vacant or an indication of whether the parking spot is occupied to at least one of: a vehicle, a dynamic sign, a mobile device, and a guidance light.

16. The method of claim 12, further comprising the step of transmitting to a guidance light an indication of whether the parking spot is vacant or an indication of whether the parking spot is occupied.

17. The method of claim 12, wherein the step of directing a LIDAR device in the direction of a parking spot comprises alternately directing a LIDAR device in the direction of a plurality of parking spots;

wherein the step of using the LIDAR device to determine a baseline surface distance comprises determining a baseline surface distance for each of the plurality of parking spots when the LIDAR device is directed to each of the plurality of parking spots;

wherein the step of determining a baseline vehicle distance comprises determining a baseline vehicle distance for each of the plurality of parking spots;

wherein the step of using the LIDAR device to determine a measured distance comprises determining a measured distance for each of the plurality of parking spots;

wherein the step of determining that the parking spot is occupied comprises determining, for each of the plurality of parking spots, whether the measured distance for that parking spot is less than or equal to the baseline vehicle distance for that parking spot; and wherein the step of determining that the parking spot is vacant, comprises determining, for each of the plurality of parking spots, whether that measured distance of that parking spot is greater than the baseline vehicle distance for that parking spot.

18. A method of detecting the presence of a vehicle in a parking spot comprising:

directing a LIDAR device in the direction of a parking spot, wherein the LIDAR device comprises a light emitter configured to emit pulsed laser light and a light sensor configured to receive a reflection of the pulsed laser light emitted by the light emitter;

using the LIDAR device to determine a baseline surface distance by determining the distance between the LIDAR device and a surface of a parking spot when the parking spot is vacant;

determining a baseline vehicle distance corresponding to the distance between the LIDAR device and a vehicle parked in the parking spot, wherein the baseline vehicle distance is no greater than the baseline surface distance;

using the LIDAR device to determine a consecutive plurality of measured distances that correlate to the distance travelled by reflections of pulsed laser light from the LIDAR device during consecutive measurements;

determining that the parking spot is vacant, if the consecutive plurality of measured distances are all greater than the baseline vehicle distance; and determining that the parking spot is occupied, if the consecutive plurality of measured distances are all less than or equal to the baseline vehicle distance.

19. The method of claim 18, further comprising the step of using a guidance light to indicate of that the parking spot is occupied if it determined that the parking spot is occupied, wherein the guidance light will continue to indicate that the parking spot is occupied until it is determined that the parking spot is vacant.

20. A vehicle presence detection system, comprising:

a LIDAR device comprising a light emitter configured to emit pulsed laser light, and a light sensor configured to receive reflections of the pulsed laser light emitted by the light emitter, wherein the LIDAR device is directed towards a surface of a parking spot;

a memory unit; and a processing unit configured to:

use the LIDAR device to determine a measured distance that correlates to the distance travelled by reflections of the pulsed laser light from the LIDAR device;

store a measured distance in the memory unit as a baseline surface distance, wherein the baseline surface distance corresponds to the distance between the LIDAR device and the surface of the parking spot when the parking spot is vacant; and determine whether the parking spot is occupied based on a measured distance;

wherein the LIDAR device is configured to alter its direction towards each of a plurality of parking spots;

wherein the processing unit is configured to store a measured distance as a baseline surface distance for each of the plurality of parking spots, wherein each baseline surface distance corresponds to the distance between the LIDAR device and the surface of one of the plurality of parking spots when that parking spot is vacant; and wherein the processing unit is configured to determine whether each of the plurality of parking spots is occupied based on a measured distance for each of the plurality of parking spots.

21. A vehicle presence detection system, comprising:

a LIDAR device comprising a light emitter configured to emit pulsed laser light, and a light sensor configured to receive reflections of the pulsed laser light emitted by the light emitter, wherein the LIDAR device is directed towards a surface of a parking spot, and wherein the LIDAR device is configured to alter its direction according to a period;

a memory unit; and a processing unit configured to:

use the LIDAR device to determine a measured distance that correlates to the distance travelled by reflections of the pulsed laser light from the LIDAR device;

store a measured distance in the memory unit as a baseline surface distance, wherein the baseline surface distance corresponds to the distance between the LIDAR device and the surface of the parking spot when the parking spot is vacant; and determine whether the parking spot is occupied based on a measured distance.

22. A vehicle presence detection system, comprising:

a LIDAR device comprising a light emitter configured to emit pulsed laser light, and a light sensor configured to receive reflections of the pulsed laser light emitted by the light emitter, wherein the LIDAR device is directed towards a surface of a parking spot;

a memory unit; and a processing unit configured to:

use the LIDAR device to determine a measured distance that correlates to the distance travelled by reflections of the pulsed laser light from the LIDAR device;

store a measured distance in the memory unit as a baseline surface distance, wherein the baseline surface distance corresponds to the distance between the LIDAR device and the surface of the parking spot when the parking spot is vacant;

determine whether the parking spot is occupied based on a measured distance;

store a baseline vehicle distance corresponding to the distance between the LIDAR device and a vehicle parked in the parking spot, wherein the baseline vehicle distance of the parking spot is less than the baseline surface distance for the parking spot; and determine if the parking spot is occupied by determining if the measured distance is less than the baseline vehicle distance.

23. A vehicle presence detection system, comprising:

a LIDAR device comprising a light emitter configured to emit pulsed laser light, and a light sensor configured to receive reflections of the pulsed laser light emitted by the light emitter, wherein the LIDAR device is directed towards a surface of a parking spot;

a memory unit; and a processing unit configured to:

use the LIDAR device to determine a measured distance that correlates to the distance travelled by reflections of the pulsed laser light from the LIDAR device;

store a measured distance in the memory unit as a baseline surface distance, wherein the baseline surface distance corresponds to the distance between the LIDAR device and the surface of the parking spot when the parking spot is vacant;

determine whether the parking spot is occupied based on a measured distance;

store a baseline vehicle distance corresponding to the distance between the LIDAR device and a vehicle parked in the parking spot, wherein the baseline vehicle distance for the parking spot is less than the baseline surface distance for the parking spot;

store a minimum vehicle distance, wherein the minimum vehicle distance for the parking spot is less than the baseline vehicle distance for the parking spot;

discard any measured distance that is greater than the baseline surface distance or less than the minimum vehicle distance; and determine that the parking spot is occupied if the measured distance is less than the baseline vehicle baseline and greater than the minimum vehicle distance.

* * * * *